United States Patent [19]

Okuyama et al.

[11] Patent Number: 6,136,286
[45] Date of Patent: *Oct. 24, 2000

[54] CARBON BLACK

[75] Inventors: Kohei Okuyama; Mitsuo Suzuki, both of Yokohama, Japan

[73] Assignee: Mitsubishi Chemical Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/824,182

[22] Filed: Mar. 26, 1997

Related U.S. Application Data

[63] Continuation of application No. 08/410,532, Mar. 27, 1995, abandoned.

[30] Foreign Application Priority Data

Mar. 28, 1994 [JP] Japan ..................... 6-057258

[51] Int. Cl.⁷ ........................................ C09C 1/56
[52] U.S. Cl. ........................... 423/449.1; 423/449.5
[58] Field of Search ................. 423/449.1, 449.5

[56] References Cited

U.S. PATENT DOCUMENTS

| | | | |
|---|---|---|---|
| 3,216,843 | 11/1965 | Heller | 423/449.5 |
| 3,245,820 | 4/1966 | Mclore | 423/449.5 |
| 3,247,003 | 4/1966 | Pollock | 423/449.5 |
| 3,364,048 | 1/1968 | May et al. | 423/449.5 |

FOREIGN PATENT DOCUMENTS

| | | | |
|---|---|---|---|
| 522383 | 3/1956 | Canada | 423/449.5 |
| 890775 | 2/1943 | France . | |
| P3742 IVa/22f | 2/1956 | Germany . | |
| 1 467 417 | 3/1969 | Germany . | |
| 1 592 855 | 3/1973 | Germany . | |
| 1043911 | 9/1966 | United Kingdom . | |

OTHER PUBLICATIONS

*Basic Principles of Organic Chemistry*, Roberts & Caserio 2nd ed. 1977.

*Primary Examiner*—Tom Dunn
*Assistant Examiner*—Stuart L. Hendrickson
*Attorney, Agent, or Firm*—Nixon & Vanderhye

[57] ABSTRACT

A carbon black having a ratio of a maximum absorbance in a range of 1800 to 1670 cm$^{-1}$ to a maximum absorbance in a range of 1670 to 1500 cm$^{-1}$ of not less than 0.65 on condition that a straight line interconnecting the absorbances at 1805 cm$^{-1}$ and 900 cm$^{-1}$ is taken as a base line in an absorbance chart of infrared absorption spectrum.

9 Claims, 4 Drawing Sheets

// CARBON BLACK

This is a Rule 62 File Wrapper Continuation of application Ser. No. 08/410,532, filed Mar. 27 1995, now abandoned.

BACKGROUND OF THE INVENTION

The present invention relates to a carbon black, and particularly, the present invention relates to a carbon black having remarkably improved blackness. Such carbon black is suitably used as pigments in paints, inks, resins, etc.

Among the commercially produced pigments, carbon black has the smallest particle size. Since it possesses high hiding power and tinting strength, it has been used as black pigments in paints, inks, resins, etc. The blackness is mainly attributed to its particle size and the improvement of the blackness is attained by decreasing the particle size and increasing the specific surface area. However, the decrease of the particle size causes the problem of worsening dispersibility, and as a result, adjustment of the amount of a surface volatile component (surface oxygen-containing functional group) has been proposed.

The carbon black is mainly classified according to methods of manufacture, into channel black and furnace black. The furnace black is usually insufficient in blackness compared with the channel black. Especially, to use as a high-quality carbon black for color which is required to have a small particle size and a high specific surface area, it is necessary to conduct an after-treatment for in improving the dispersibility.

The conventional carbon black with improved blackness as mentioned above does not always gave good dispersibility. A carbon black with high blackness which shows an excellent dispersibility and is usable in a wide range of commercial applications has been still demanded.

The present inventors have found that when a carbon black with specific physical properties is provided, its blackness can be remarkably improved without decreasing the particle size, namely, without worsening the dispersibility. The present invention has been attained based on the finding.

SUMMARY OF THE INVENTION

In a first aspect of the present invention, there is provided a carbon black having a ratio of a maximum absorbance in a range of 1800 to 1670 cm$^{-1}$ to a maximum absorbance in a range of 1670 to 1500 cm$^{-1}$ of not less than 0.65 on condition that a straight line interconnecting absorbances a- 1805 cm$^{-1}$ and 900 cm$^{-1}$ is taken as a base line in an absorbance chart of infrared absorption spectrum.

In a second aspect of the present invention, there is provided a furnace black having a ratio of the maximum absorbance in a range of 1800 to 1670 cm$^{-1}$ to the maximum absorbance in a range of 1670 to 1500 cm$^{-1}$ of not less than 0.5 on condition that a straight line interconnecting absorbances at 1805 cm$^{-1}$ and 300 cm$^{-1}$ is taken as a base line in an absorbance chart of infrared absorption spectrum.

DETAILED DESCRIPTION OF THE INVENTION

Figure 1:
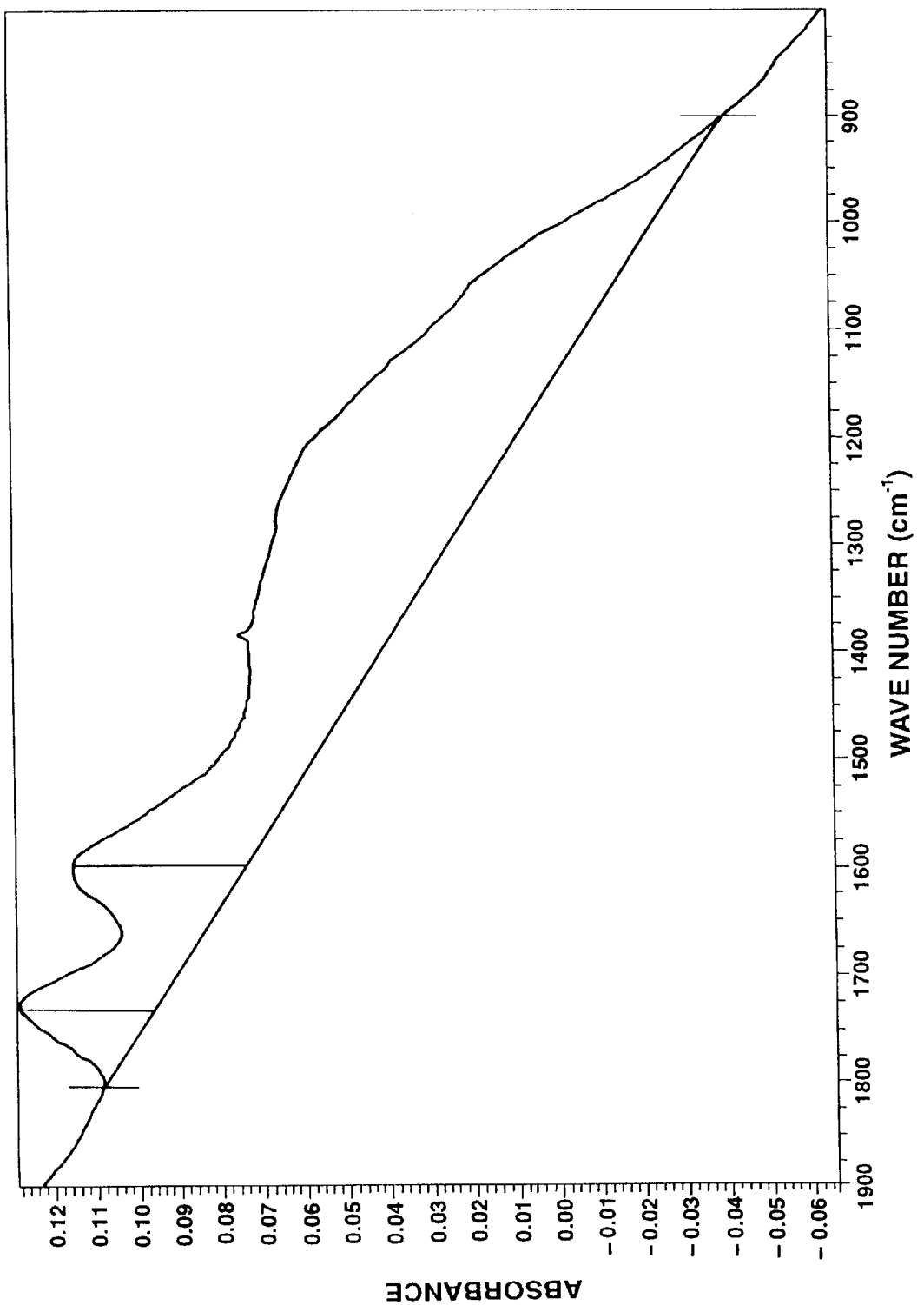
FIG. 1 represents an infrared absorption spectrum obtained in Example 1.

The carbon black of the present invention has the ratio of the maximum absorbance in the range of 1800 to 1670 cm$^{-1}$ to the maximum absorbance in the range of 1670 to 1500 cm$^{-1}$ of not less than 0.65, preferably from 0.65 to 2.0, and more preferably from 0.65 to 1.5, on condition that the straight line interconnecting the absorbances at 1805 cm$^{-1}$ and 900 cm$^{-1}$ is taken as a base line, in the absorbance chart of infrared absorption spectrum. The absorption chart is represented in absorbance at regular intervals versus wave number at regular intervals.

In particular, when the carbon black is furnace black, the furnace black whose absorbance ratio mentioned above is not less than 0.5 can acquire substantial improvement in blackness. So, the present invention includes the furnace black whose absorbance ratio is not less than 0.5.

The infrared absorption spectrum is obtained, for example, by the KBr tablet transmission method using a Fourier transform infrared spectrometer (FT-IR). From the obtained infrared absorption spectrum, the ratio of the maximum absorbance in the range of 1800 to 1670 cm$^{-1}$ to the maximum absorbance in the range of 1670 to 1500 cm$^{-1}$ is determined on condition that the straight line interconnecting the absorbances at 1805 cm$^{-1}$ and 900 cm$^{-1}$ is taken as a base line in the absorbance chart.

An absorption assigned to a carboxyl group (1720 cm$^{-1}$) exists in the range of 1800 to 1670 cm$^{-1}$ and absorptions assigned to a C=O bond (1650 to 1630 cm$^{-1}$) and a COO$^-$ group (1590 to 1560 cm$^{-1}$) exist in the range of 1670 to 1500 cm$^{-1}$. The shape of a spectrum including these absorptions reflects the surface condition of the carbon black, and the blackness of the carbon black can be remarkably increased by controlling the ratio of the maximum absorbance in the range of 1800 to 1670 cm$^{-1}$ to the maximum absorbance in the range of 1670 to 1500 cm$^{-1}$ to not less than 0.65, preferably in the range of 0.65 to 2.0, and more preferably in the range of 0.65 to 1.5, on condition that the straight line interconnecting the absorbances at 1805 cm$^{-1}$ and 900 cm$^{-1}$ is taken as a base line in the absorption chart of infrared absorption spectrum.

A type of carbon black which is marketed as channel black is partially oxidized, but it has the ratio of the maximum absorbance in the range of 1800 to 1670 cm$^{-1}$ to the maximum absorbance in the range of 1670 to 1500 cm$^{-1}$ of less than 0.65 on condition that the straight line interconnecting the absorbances at 1805 cm$^{-1}$ and 900 cm$^{-1}$ is taken as a base line in the absorption chart of infrared absorption spectrum.

Some of types of carbon black which are marketed as furnace black are slightly oxidized, but they have the ratio of the maximum absorbance in the range of 1800 to 1670 cm$^{-1}$ to the maximum absorbance in the range of 1670 to 1500 cm$^{-1}$ of less than 0.5 on condition that the straight line interconnecting the absorbances at 1805 cm$^{-1}$ and 900 cm$^{-1}$ is taken as a base line in the absorption chart of infrared absorption spectrum.

The carbon black of the present invention can be produced by subjecting such carbon black to a surface treatment so as to make the adsorbance ratio not less than 0.65 (not less than 0.5 in case of furnace black). The carbon black of the present invention exhibits remarkably improved blackness as compare with the ordinary carbon black having the same particle size and the same specific surface area.

As the raw material for the production of the carbon black of the present invention, any of the various carbon blacks including the channel black and the furnace black mentioned above can be used. The furnace black is preferable in view of the environment and manufacture.

The method for the surface treatment of carbon black has no particular restriction unless the carbon black has the ratio of the maximum absorbance in the range of 1800 to 1670 $cm^{-1}$ to the maximum absorbance in the range of 1670 to 1500 $cm^{-1}$ becomes less, than 0.65 on condition that the straight line interconnecting the absorbances at 1805 $cm^{-1}$ and 900 $cm^{-1}$ is taken as a base line in the absorbance chart of infrared absorption spectrum. Examples of the method for the surface treatment include oxidation with the air at an elevated temperature, oxidation with ozone, oxidation with nitric acid, catalytic oxidation, low temperature plasma oxidation, and addition of an organic acid. Among the methods cited above, the oxidation with ozone is preferable, considering degree of oxidation, cost of manufacture and handling property as a whole.

As respects the conditions for the oxidation with ozone, the ozone concentration is generally from 0.01 to 50 $g/m^3$, the duration of treatment is generally from 10 seconds to 200 hours, and the pressure may be either increased or reduced, but normal pressure is preferably in view of economy and safety. The reaction vessel may be a fixed bed type or a fluidized bed type. The temperature is controlled so as to preclude the possibility of dust explosion.

The carbon black of the present invention has a high degree of blackness as compared with the ordinary carbon black having the same particle diameter and the same specific surface area. Also, according to the carbon black of the present invention, the same blackness as that of the ordinary carbon black at a larger particle diameter and a smaller specific surface area.

When the carbon black of the present invention is incorporated in paints, inks, resins, etc., the carbon black remarkably improve the blackness thereof. Thus, the carbon black of the present invention is industrially valuable.

EXAMPLES

The present invention will be described more specifically below with reference to examples. It should be noted that the present invention is not limited thereto, unless it goes beyond the scope of the present invention.

Example 1

In a rotary kiln made of glass, 10 g of furnace black having a particle size of 13 nm and a S BET specific surface area of 360 $m^2/g$ ("#2600" (trade name), produced by Mitsubishi Chemical Corp.) was treated for 100 hours by passing an ozone-containing gas at a flow rate of 0.6 liter/min, so as to supply 0.2 g/h of ozone.

The carbon black thus oxidized with ozone was analyzed for infrared absorption spectrum by the KBr tablet transmission method using a Fourier transform infrared spectrometer (FT-IR, "Nicolet Magna 550", manufactured by Nicolet Instrument Corporation). A detector, MCT was operated at a resolution of 4 $cm^{-1}$, and at a number of scans of 256. The equipment to be used was thoroughly dried previously. A tablet solely of KBr was prepared. Namely, the KBr tablet was produced by pulverizing KBr crystals in an agate mortar, placing 0.1 g of the pulverized crystals in a tableting mold of 10 mm in cavity diameter (produced by Nippon Bunko K.K.), deaerating for five minutes, and under vacuum, compression-molding at a pressure of 500 $kg/cm^2$ for one minutes with a hydraulic pres. The produced tablet was set in a sample chamber of the FT-IR, purged with nitrogen gas for one hour, and analyzed for a spectrum, which was used as a background. Then, the carbon black was dried at 115° C. for one hour. The dried carbon black and KBr were mixed at a ratio of 1:7000 in an agate mortar and 0.1 g of the resultant mixture was tableted by the same procedure as described above. The produced tablet was set in the sample chamber of the FT-IR, purged with nitrogen gas for 30 minutes, and analyzed for a spectrum. In the obtained infrared absorption spectrum in the chart of absorbance at regular intervals versus wave number at regular intervals, the ratio of the maximum absorbance in the range of 1800 to 1670 $cm^{-1}$ to the maximum adsorbance in the range of 1670 to 1500 $cm^{-1}$ was determined on condition that the straight line interconnecting the absorbances at 1805 $cm^{-1}$ and 900 $cm^{-1}$ was taken as a base line, as shown in FIG. 1. This ratio was 0.78.

A paint was prepared by placing 2.12 g of the carbon black, 14.88 g of varnish ("Acrose #6000" (trade name), produced by Dai-Nippon Toryo Co., Ltd.), 10 g of thinner ("Acrose #6000 thinner" (trace name), produced by Dai-Nippon Toryo Co., Ltd.), and 90 g of glass beads (2.5 to 3.5 mm in diameter) in a glass vial having a volume of 140 ml, dispersing these components for 90 minutes with a paint conditioner, then further adding 57.8 g of the varnish to the resultant dispersion, and dispersing for 30 minutes with the paint conditioner. The paint was placed in a round glass cell, allowed to set therein, and tested for L value (lightness Hunter) with a spectrometric calorimeter (0° for illumination, 45° for detection) ("SZ-Σ90" (trade name), produced by Nippon Denshoku K.K.). The L value was 3.87.

Comparative Example 1

Figure 2:
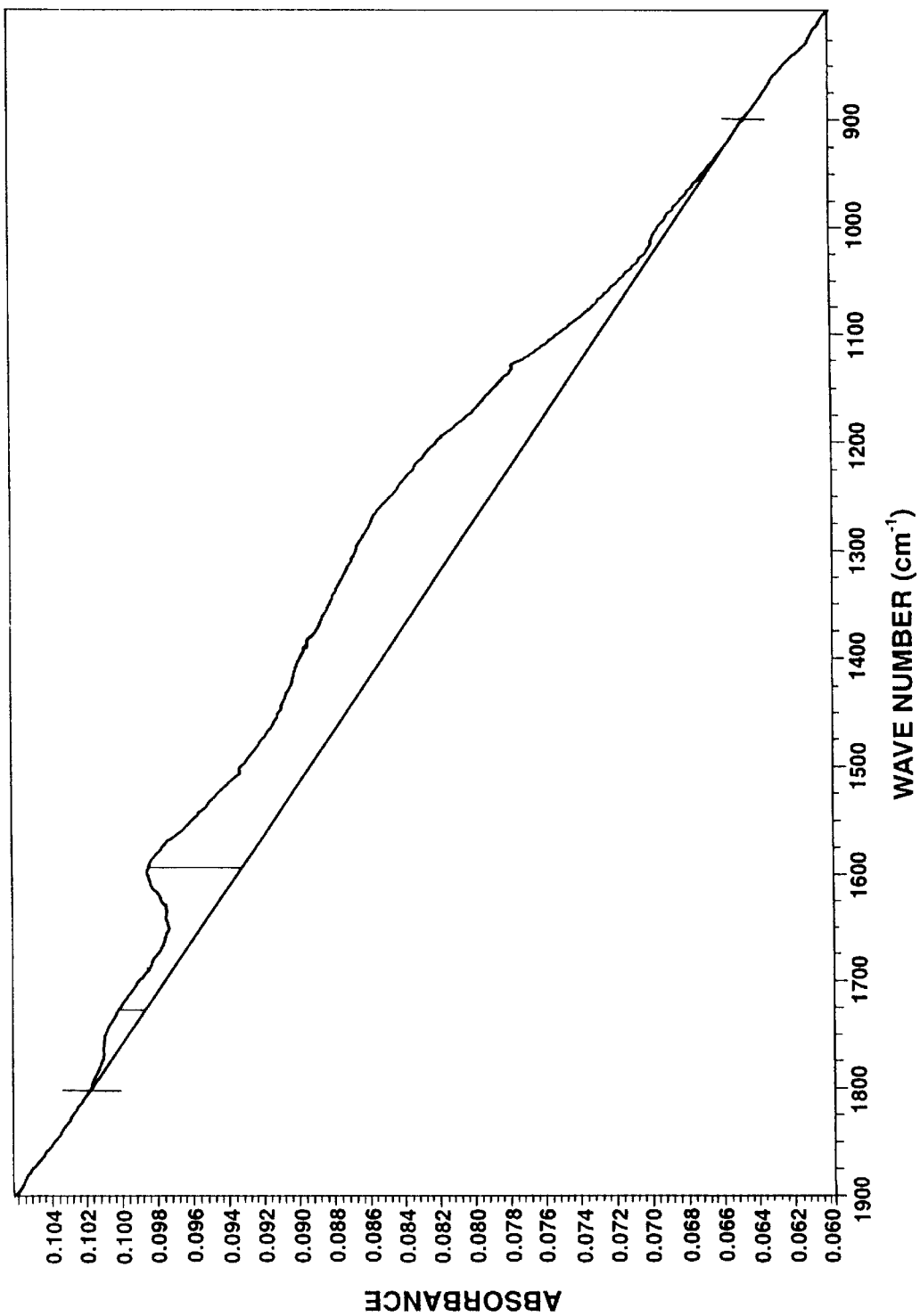
FIG. 2 represents an infrared absorption spectrum obtained in Comparative Example 1.

A furnace black having a particle size of 13 nm and a S BET specific surface area of 360 $m^2/g$ ("#2650" (trade name), produced by Mitsubishi Chemical Corp.), was analyzed for infrared absorption spectrum (FIG. 2) by the same procedure as in Example 1. A paint was prepared similarly and tested for L value. The absorbance ratio was 0.25. The L value of the paint was 5.19.

Comparative Example 2

Figure 3:
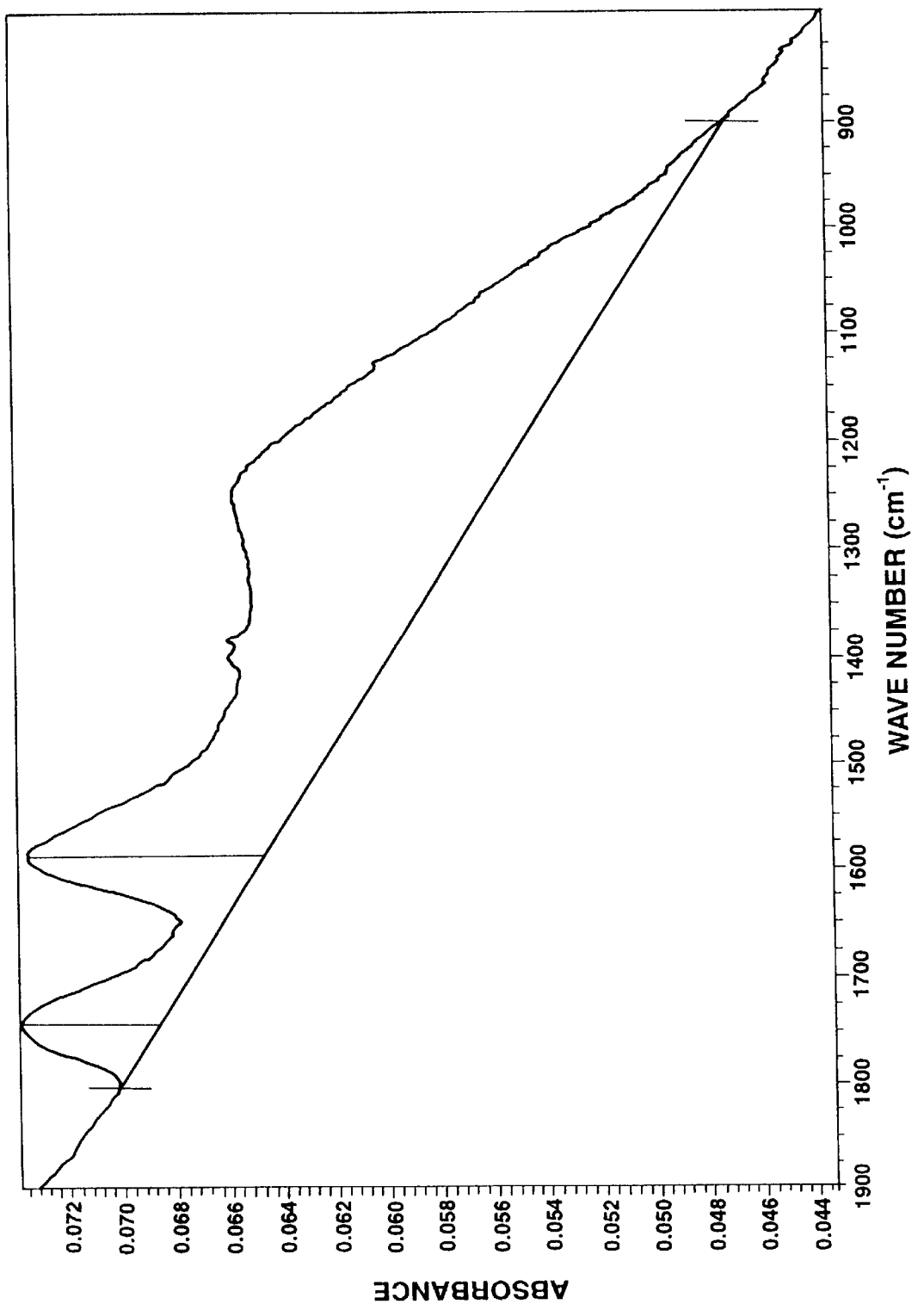
FIG. 3 represents an infrared absorption spectrum obtained in Comparative Example 2.

A commercially available channel black having a particle diameter of 11 nm aid a S BET specific surface area of 580 $m^2/g$ ("FW200" (trade name), produced by Degussa) was analyzed for in rared absorption spectrum (FIG. 3) by the same procedure as in Example 1. A paint was prepared similarly and tested for L value. The absorbance ratio was 0.58. The L value of the paint was 4.58.

Comparative Example 3

Figure 4:
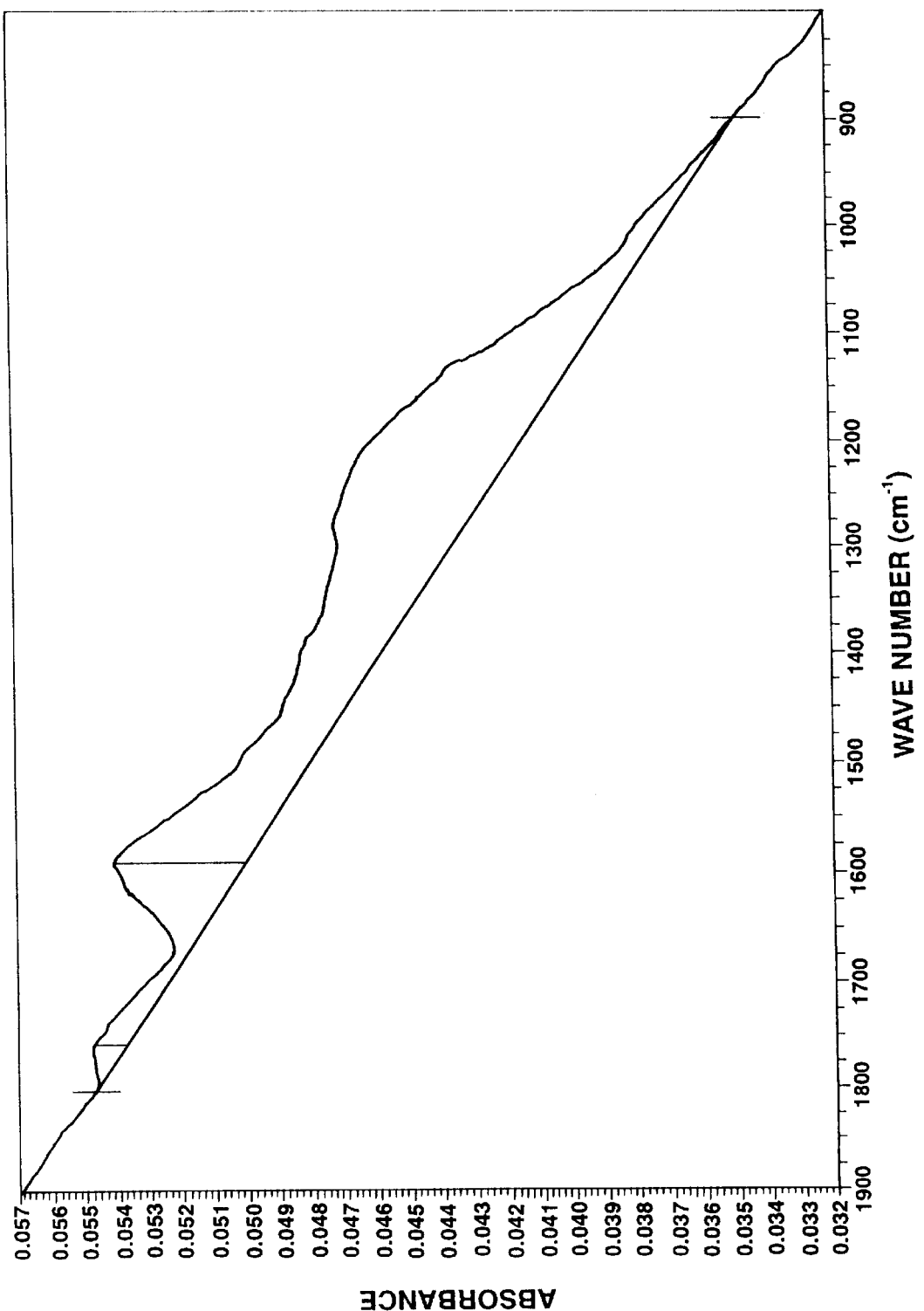
FIG. 4 represents an infrared absorption spectrum obtained in Comparative Example 3.

A commercially available furnace black having a particle diameter of 11 nm and a S BET specific surface area of 540 $m^2/g$ ("Monarch 300" (trade name), produced by Cabot) was analyzed for infrared absorption spectrum (FIG. 4) by the same procedure as in Example 1. A paint was prepared similarly and tested Cor L value. The absorbance ratio was 0.25. The L value of the paint was 4.69.

What is claimed is:

1. A carbon black treated by oxidation i with ozone having the ratio of a maximum absorbance in a range of 1800 to 1670) $cm^{-1}$ to the maximum absorbance in a range of 1670 to 1500 $cm^{-1}$ of not less than 0.65 when a straight line interconnecting absorbances at 1805 $cm^{-1}$ and 900 $cm^{-1}$ is taken as a base line in an absorbance chart of the infrared absorption spectrum.

2. A carbon black treated by oxidation with ozone according to claim 1, wherein the ratio is from 0.65 to 2.0.

3. A furnace black treated by oxidation with ozone having the ratio of the maximum absorbance in a range of 1800 to 1670 cm$^{-1}$ to the maximum absorbance in a range of 1670 to 1500 cm$^{-1}$ of not less than 0.5 when a straight line interconnecting absorbances at 1805 cm$^{-1}$ and 900 cm$^{-1}$ is taken as a base line in an absorbance chart of the infrared absorption spectrum.

4. A carbon black treated by oxidation with ozone according to claim 3, wherein the ratio is from 0.65 to 2.0.

5. A carbon black treated by oxidation with ozone according to claim 1, which is produced by subjecting a carbon black to oxidation with ozone.

6. A furnace black treated by oxidation with ozone according to claim 3, which is produced by subjecting a furnace black to oxidation with ozone.

7. A process for producing the carbon black treated by oxidation with ozone of claim 1, comprising subjecting a carbon black to oxidation with ozone.

8. A process for producing the furnace black treated by oxidation with ozone of claim 3, comprising subjecting a furnace black to oxidation with ozone.

9. A carbon black treated by oxidation with ozone having in the infrared absorbance spectrum a ratio of maximum absorbance in a range of 1800 to 1670 cm$^{-1}$ to the maximum absorbances in a range ol 1670 to 1500 cm$^{-1}$ of at least 0.65, wherein said absorbances are measured from a base line interconnecting the points at 1805 cm$^{-1}$ and at 900 cm$^{-1}$ at which two points there is no absorbance.

* * * * *